Sept. 19, 1967    C. J. WHITFIELD ET AL    3,342,506
SHOCK ABSORBING SUSPENSION SYSTEM FOR FARM IMPLEMENTS
Filed April 1, 1965
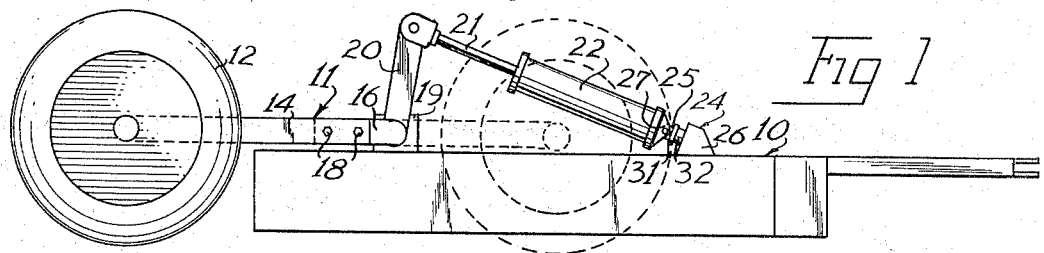
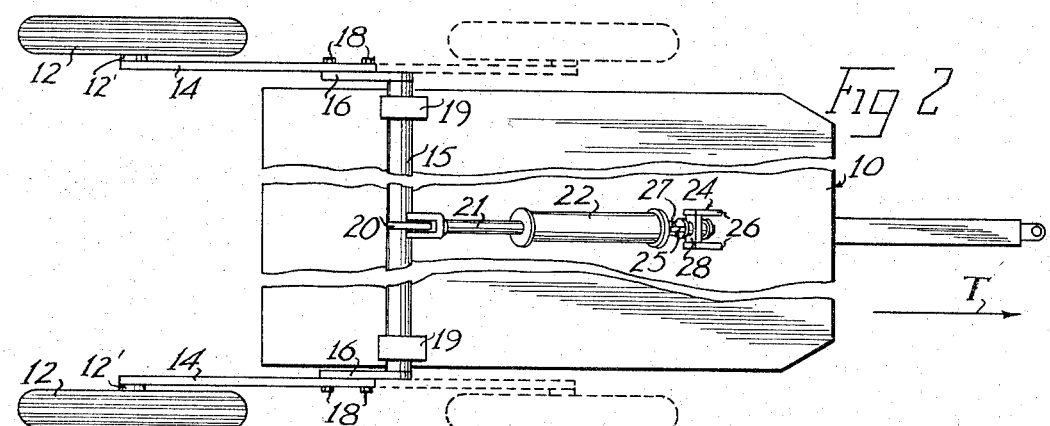
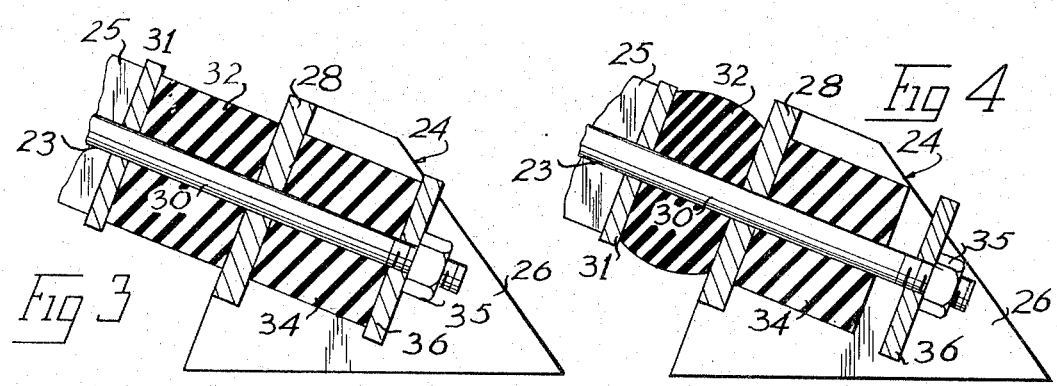
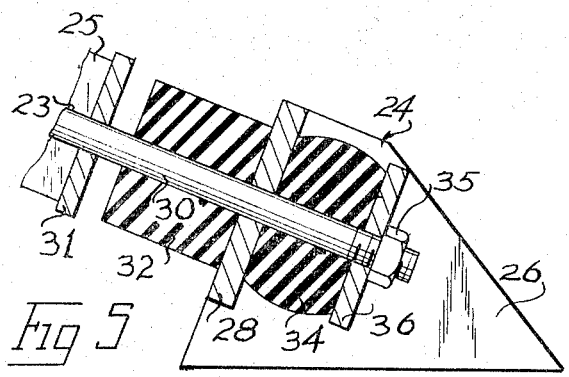
INVENTORS
CARROLL J. WHITFIELD
WALTER F. GODWIN
BY
ATTORNEYS

United States Patent Office 3,342,506
Patented Sept. 19, 1967

3,342,506
SHOCK ABSORBING SUSPENSION SYSTEM FOR FARM IMPLEMENTS
Carroll J. Whitfield and Walter F. Godwin, Albany, Ga., assignors to Lilliston Implement Company, Albany, Ga., a corporation of Georgia
Filed Apr. 1, 1965, Ser. No. 444,585
8 Claims. (Cl. 280—43.23)

This invention relates generally to suspension systems for transporting devices and more particularly to a shock absorbing suspension system for farm implements.

It is generally desirable that suspension systems for farm implements such as mowers, rakes, and the like, have shock absorbing members included therein in order that excessive wear of the joints of the suspension system be prevented when subjected to the shock loads normally encountered in the use of the farm implement. It is also desirable that these suspension systems employ a minimum of movement when in use in order that the relation of the farm implement with respect to the ground is not substantially changed. Moreover, it is desirable that the suspension system be simple in construction, easy to manufacture and maintain, and reliable in operation.

The invention disclosed herein is capable of absorbing all vertically directed forces applied to a pair of wheels that are adapted to be located alternately at two positions spaced along the longitudinal axis of the farm implement so that a manufacturer of farm machinery can easily utilize this suspension system in many types of farm equipment without any substantial changes in the basic structure. Succinctly, the shock absorbing member employs two compressible, deformable members that are positioned on opposite sides of a fixed member. Freedom of transverse displacement is afforded each compression member, one being utilized to absorb the vertical forces applied to the wheels when the pair is positioned forwardly along the longitudinal axis of the farm implement, the other being utilized to absorb the vertical forces applied to the wheels when the pair is disposed rearwardly along the longitudinal axis of the farm implement. The shock absorbing member is of a simple and rugged construction so that substantially no maintenance is required while in use. Moreover, a single adjusting means is included on the shock absorber for varying the resistance to the forces asserted thereon rather than requiring a plurality of adjusting means, as found in the prior art for changing the resistance of shock absorber to forces exerted thereon. The suspension system of the present invention, being of a simple and refined construction, is therefore easily manufactured.

These and other features and advantages become more apparent upon consideration of the following specification and the accompanying drawings wherein like characters of reference designate corresponding parts throughout and in which:

FIG. 1 is a side elevational view of a farm implement illustrating the suspension system of the present invention and showing the alternate position of the wheels in dashed lines;

FIG. 2 is a partial top plan view of the farm implement shown in FIG. 1;

FIG. 3 is a cross-sectional view of the shock absorbing member of the suspension system in its relaxed position having no compressive forces exerted thereon;

FIG. 4 is a cross-sectional view of the shock absorbing member shown in FIG. 3 with a compressive force being exerted on the said member from a first direction; and, FIG. 5 is a cross-sectional view of the shock absorbing member shown in FIG. 3 with a compressive force being exerted in a second direction that is opposite from that shown in FIG. 4.

The accompanying drawings and the following specification disclose a preferred embodiment of the present invention but the details disclosed herein are not intended to limit the present inventive concept since it may be embodied in other equivalent forms.

Referring to FIGS. 1 and 2, the farm implement partially shown includes a chassis designated generally by the numeral 10 and the suspension system associated therewith is designated generally by the numeral 11. The suspension system on wheeled support means 11 comprises a pair of wheels 12 rotatably mounted on axles 12' extending perpendicular to the direction of travel of the farm implement as indicated at T. The axles 12' are fixedly mounted on the extending ends of support arms 14 positioned outwardly of the farm implement 10 and substantially parallel to the sides thereof. The arms 14 are removable secured to substantially horizontally extending members 16 through a plurality of bolts 18 for positioning the wheels 12 in a first position shown in solid lines in FIG. 2 and a second position shown in dashed lines in FIG. 2. The members 16 are fixedly attached to the ends of a transverse shaft 15 which is rotatably mounted on the chassis 10 by pivot blocks 19 and which extends across and outwardly of the sides thereof.

Extending upwardly from approximately the midpoint of the shaft 15 is a connector link 20 which is pinned at its upper end to a piston rod 21 of a hydraulic cylinder or mechanical jack 22. The connector link 20 is positioned on the shaft 15 so that when the connector link 20 is in a substantially vertical position, the members 16 are in a substantially horizontal position. It will thus be seen that movement of the piston rod 21 into and out of the hydraulic cylinder 22 will cause the connector link 20 to rotate the shaft 15 and thus raise or lower the wheels 12. This serves to adjust the height of the farm implement above the ground.

The shock absorbing member 24 comprises two vertically extending parallel spaced support plates 26, fixedly attached at their lower sides to the chassis in known manner, and joined by bumper plate 28 extending therebetween. The fixed bumper plate 28 is positioned so as to be approximately perpendicular to the force applied to the shock absorbing member 24 through the hydraulic cylinder 22. The bumper plate 28 has an aperture 29 extending through the center thereof just large enough to slidably receive a transmitting rod member 30 therethrough. The end of the transmitting member 30 nearest the end of the hydraulic cylinder 22 is fixedly attached such as by welding, to a slotted portion 23 of the input plate 25. The input plate 25 is in turn pinned to outwardly disposed mounting lugs 27 of the hydraulic cylinder 22 so that the cylinder 22 is rotatable thereabout for transmitting the forces exerted upon the hydraulic cylinder 22 through the input plate 25 to the transmitting member 30. Adjacent the input plate 25 and surrounding the transmitting member 30 is a circular compression plate 31 and extending between the compression plate 31 and the bumper plate 28 is a rubber sleeve 32 which suround the transmitting member 30 so that it separates the bumper plate 28 and the compression member 31. Encircling the transmitting member 30 and adjacent the inner surface of bumper plate 28 is a second rubber sleeve 34. The end of the transmitting member 30 extending through the rubber sleeve 34 is threaded to receive a nut 35 thereon. The nut 35 serves to hold a second compression member 36 against the inner surface of the rubber sleeve 34. It will be seen that by tightening the nut 36 on the transmitting member 30, the rubber sleeves 32 and 34 will be compressed between members 31 and 36 as they are forced toward the fixed bumper plate 28 and the resistance to forces exerted on the input plate 25 will be increased. On the other hand, loosening the portion of nut 36 will decrease the resistance to the forces exerted on input plate 25.

In operation, it will be seen when the wheels 12 are in position as shown in solid lines in FIG. 2, that moving the piston rod 21 outwardly from the hydraulic cylinder 22 lowers the wheels 12 and raises the farm implement 10. When an obstacle strikes the wheels 12, a shock force is transmitted in turn through the support arms 14, the connector link 20, and the hydraulic cylinder 22 to the input plate 25 forcing it toward the fixed bumper plate 28. This causes the compression member 31 to compress the rubber sleeve 32 which in turn absorbs the shock force exerted on the wheel 12. The rubber sleeve 32, being relatively thick and being allowed to expand freely in a direction perpendicular to the direction of shock force applied to the input plate 25, absorbs the force rapidly enough to prevent substantial movement of the farm implement with respect to the ground, yet gradual enough to prevent excessive strain on the pinned joints and related members of the suspension system 11 such as between the connector link 20 and piston rod 21 and between mounting lugs 27 and input plate 25.

When the support arms 14 are positioned to extend forwardly so that the wheels are in the position shown by the dashed lines in FIG. 2, that movement of the piston rod 21 into the hydraulic cylinders 22 will cause the wheels 12 to be lowered and thus raise the farm implement. A shock force exerted on the wheels 12 will be transmitted in turn through the support arms 14, the connector link 20, the hydraulic cylinder 22, to the input plate 25 to that the input plate 25 is forced to move away from the bumper plate 28. This causes the compression member 36 to force the rubber sleeve 34 toward the fixed bumper plate 28 and compress it so that the shock force is absorbed by the rubber sleeve 34 as it is allowed to expand freely in the direction perpendicular to that of the force applied to the input plate 25. Therefore, it is easily seen that the shock absorbing member 24 makes possible a suspension system in which shock forces are absorbed without a deleterious effect on the pinned joints thereof while at the same time restricting the vertical movement of the farm implement with respect to the ground regardless of whether the wheels are in their forward or rearward positions.

It will be obvious to those skilled in the art that many variations may be made in the embodiments shown for the purpose of illustrating the present invention without departing from the scope thereof as defined by the appended claims.

What is claimed is:

1. A suspension system for wheeled farm implements including a support frame, a support shaft pivotally connected to said frame, wheel support arms rigidly connected to said support shaft and constructed to extend either forwardly or rearwardly of said frame, a connector link rigidly connected to said support shaft, an hydraulic cylinder connected to said connector link, a transmitting rod connected at one of its ends to said hydraulic cylinder, a bumper plate defining an aperture therein rigidly connected to said frame, the other end of said transmitting rod extending through the aperture in said bumper plate, elastic compression members loosely connected to said transmitting rod on both sides of said bumper plate, and rigid compression members rigidly connected to said transmitting rod on the sides of the elastic compression members remote from said bumper plate so that when the wheel support arms extend forwardly of the frame and the wheels of the frame engage an obstruction, the transmitting rod will be moved in a first direction through the bumper plate aperture and one of said elastic compression members will be compressed between the bumper plate and one of the rigid compression members, and when the wheel support arms extend rearwardly of the frame and the wheels of the frame engage an obstruction, the transmitting rod will be moved in the opposite direction through the bumper plate aperture and the other of said elastic compression members will be compressed between the bumper plate and the other of the rigid compression members.

2. A suspension system for farm implements including a chassis, wheeled supporting means pivotally connected to said chassis constructed to extend forwardly or rearwardly of said chassis, a connector link connected at one of its ends to said wheeled supporting means, an expandable member connected to the other end of said connector link for varying the height of said wheeled supporting means, an apertured fixed member secured to said chassis, said expandable member including a projection extending through the aperture of said fixed member, and freely expandable shock absorbing members positioned on each side of said fixed member about said projection, one of said shock absorbing members being engageable with said fixed member upon upward movement of the wheel supporting means with respect to said chassis when extending forwardly of said chassis, and the other of said shock absorbing members being engageable with said fixed member upon upward movement of the wheel supporting means with respect to said chassis when extending rearwardly of said chassis.

3. The invention of claim 2 wherein each of said shock absorbing members comprises an elastic member disposed about said connecting member adjacent said fixed member, and a rigid member fixedly connected to said connecting member on the side of its elastic member remote from the fixed member.

4. The invention of claim 3 wherein the rigid member of at least one of said shock absorbing members is adjustable toward or away from the rigid member of the other of said shock absorbing members.

5. The invention of claim 3 wherein said elastic members are free to expand in a radial direction with respect to said connecting member.

6. The invention of claim 2 wherein said expandable member comprises an hydraulic cylinder mechanism connected to said connector link for varying the position of said wheeled supporting means.

7. In a suspension system for farm implements including a chassis, wheeled supporting means pivotally connected to said chassis and constructed to extend either forwardly or rearwardly of said chassis, a connector member connected to said wheel supporting means, an hydraulic cylinder connected to said connector member, a fixed member secured to said chassis, a rod connected to said hydraulic cylinder extending through and slidable with respect to said fixed member upon movement of said wheeled supporting means with respect to said chassis, expandable shock absorbing members connected to said rod on each side of said fixed member, a first compression member positioned on said rod on the side of one shock absorbing member remote from said fixed member, and a second compression member positioned on said rod on the side of the other shock absorbing member remote from said fixed member whereby said shock absorbing members are alternately compressed between said fixed member and said compression members upon movement of said slidable rod in a given direction with respect to said fixed member.

8. In a suspension system for farm implements including a chassis, wheeled supporting means pivotally connected to said chassis and constructed to extend either forwardly of or rearwardly of said chassis, a connector member rigidly connected to said wheeled supporting means, an expandable member connected to said connector member, a fixed member secured to said chassis, said expandable member being slidably connected to said fixed member for slidable movement through said fixed member upon movement of said supporting means with respect to said chassis, freely expandable shock absorbing members connected to said rod on each side of said fixed member, a first compression member fixed to said expandable member on the outer side of one shock absorbing member remote from said fixed member, and a second compression member on said expandable member on the side of the other shrock absorbing member remote from said fixed member, said shock absorbing members being alternately compressed upon alternate movements of said expandable member with respect to said fixed member, said second compression member being loosely mounted on said rod and retained thereon by threadably adjustable means adapted to adjustably vary the tension between said compression members.

References Cited

UNITED STATES PATENTS

| 2,848,244 | 8/1958 | Georgi | 267—1 |
| 2,918,298 | 12/1959 | Starr | 280—43.23 |

FOREIGN PATENTS

| 1,229,793 | 3/1960 | France. |
| 1,286,487 | 1/1962 | France. |

ARTHUR L. LA POINT, *Primary Examiner.*

R. M. WOHLFARTH, *Assistant Examiner.*